United States Patent [19]

Patterson

[11] Patent Number: 5,185,949
[45] Date of Patent: Feb. 16, 1993

[54] FISH ALERT

[76] Inventor: James S. Patterson, #7 Crissy Dr., Sandwich, Ill. 60548

[21] Appl. No.: 810,155

[22] Filed: Dec. 19, 1991

[51] Int. Cl.$^5$ ............................................. A01K 97/12
[52] U.S. Cl. ...................................................... 43/17
[58] Field of Search ............................................. 43/17

[56] References Cited

U.S. PATENT DOCUMENTS

| | | | |
|---|---|---|---|
| 3,645,028 | 2/1972 | Rayburn | 43/17 |
| 3,835,568 | 9/1974 | Whitfield | 43/17 |
| 3,903,633 | 9/1975 | Hutcherson | 43/17 |
| 4,004,365 | 1/1977 | Manchester | 43/17 |
| 4,202,125 | 5/1980 | Kovacs | 43/17 |
| 4,447,979 | 5/1984 | Taylor | 43/17 |
| 4,541,196 | 9/1985 | Jershin | 43/17 |
| 4,641,453 | 2/1987 | Roberts | 43/17 |
| 4,969,285 | 11/1990 | Ellsworth | 43/17 |

Primary Examiner—Kurt C. Rowan
Attorney, Agent, or Firm—John P. Halvonik

[57] ABSTRACT

A fishing pole mounting device to signal the movements of a fishing pole when a fish strikes the bait. A cradle means rests on top of a box shaped enclosure. The cradle holds the pole and translates downward movements of the pole into an electrical signal for audible and/or visual alarms.

10 Claims, 2 Drawing Sheets

FISH ALERT

The invention represents an improvement in the art of fishing alarm monitoring device which indicate a strike by audio and/or visual means. While such devices are known, the device of the present application utilizes a planar surface as the fishing pole base which responds to downward movements of the fishing pole caused by the strike. This eliminates the need for rotational, or other movements of the pole necessary to activate other, prior art devices. A biasing thumbscrew provides an adjustment to the amount of pressure on the planar surface necessary to trigger the alarm.

SUMMARY OF THE INVENTION

The invention is a fishing alert (FA) device to indicate movement of a fishing pole signifying a strike. The device comprises a mounting cradle for the handle of the pole which rests upon the top surface of a box shaped housing designated the cover. Beneath the cover is another box shaped housing which fits into the cover and houses the electronic elements of the alarm system. A switch means (which may be located in the housing) is activated by the pressure of the cover upon the switch, the switch in turn activates the alarm system. A thumbscrew provides variable pressure on the cover to enable one to vary the amount of pressure needed to set off the fish alert.

It is an object of this invention to provide a fish alert device that indicates fishing pole movement to indicate a strike.

Another objective is to provide a fishing pole alert device which is of simple design and few moving parts.

Yet another objective is to provide a fishing pole alert device which has a covering to protect all electrical parts.

Yet another objective is to provide a planar surface upon which a fishing pole may be mounted to provide for uniform up and down movement that responds to up or down movements of a fishing pole and cradle arrangement.

Still another is to provide a fish alert alarm device with a planar surface for monitoring the up and down movements of the pole that may be adjusted for the amount of pressure needed to set off the alarm.

Other objectives of the invention will become apparent once the invention is shown and described.

Figure 1:
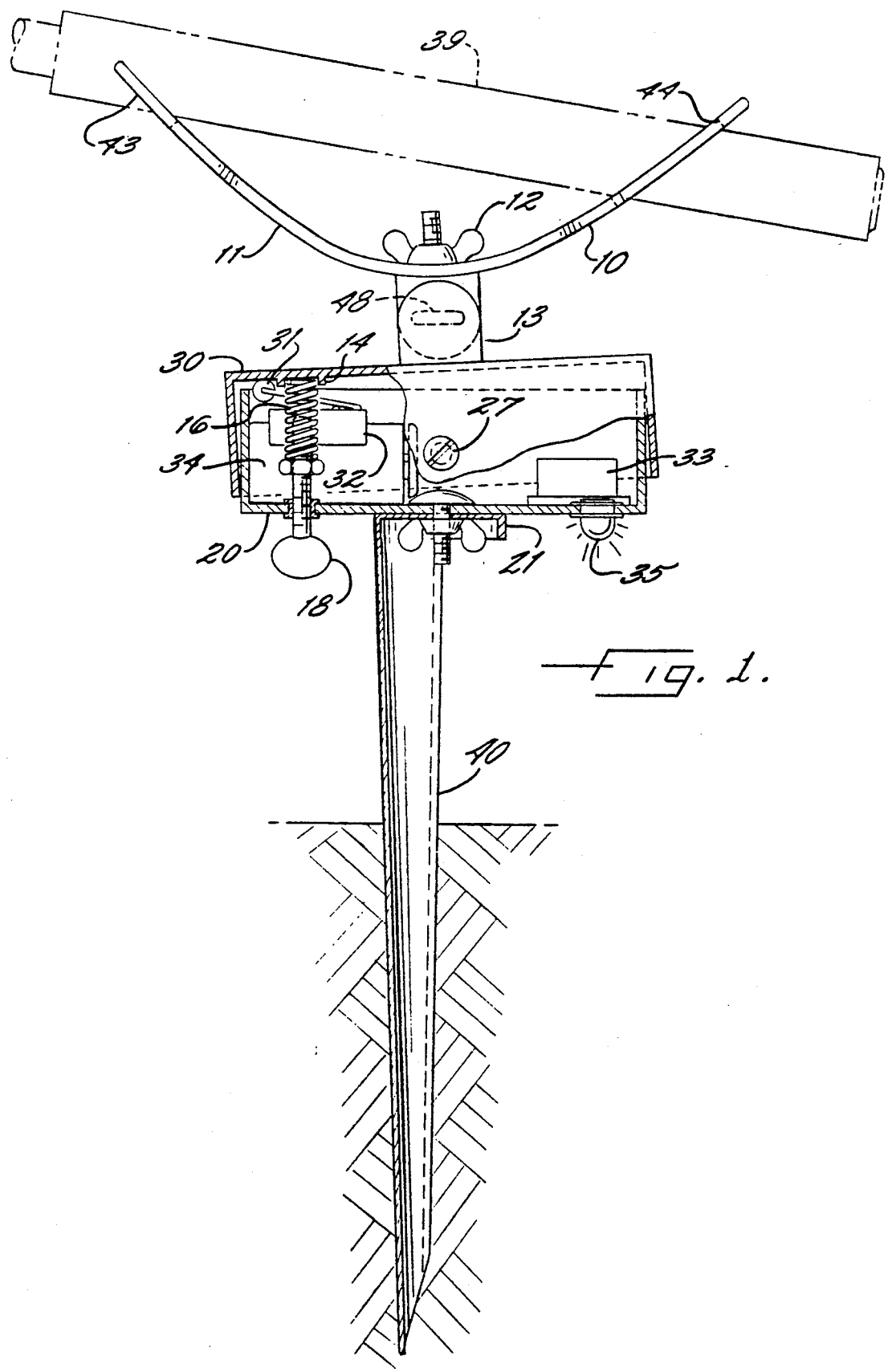
FIG. 1 shows side view of the alarm and cradle
FIG. 2 front view of alarm and cradle

LIST OF ELEMENTS 10, 11 cradle mounting
12 Thumbscrew (wingnut)
13 Top cover mount
14 spring retainer
15 threaded boss
16 spring
18 threaded thumbscrew
20 Housing
21 stake mount
22 battery stop
24 battery holder
25 housing rest
27 rotation pivot
28 buzzer mount
29 pivot pin
30 top cover
31 roller of switch
32 switch (micro switch)
33 buzzer
34 battery
35 light
37 cradle adjusting means
38 aperture of for cradle adjustment
39 handle of fishing pole
40 stake
41 stake cap
42 stake rib
43 cradle yoke
44 cradle yoke
45 cradle eye bottom
46 cradle eye
47 stake point

DESCRIPTION OF THE PREFERRED EMBODIMENT

The invention features a mounting 10 for the handle of the fishing rod 39 (other portions of the fishing rod could also be mounted to the mounting) which rests along the cradle 43 or mount at two places. The cradle, preferably, has two ends with one end an open yoke 43 (resembling a "Y" shape) and the other end a circular "eye" 44-46. The cradle is mounted with a mounting means 12,13 to the top of the upper cover 30. The cover resembles a box having a top wall and four side walls and an open bottom side. The mounting means may be a threaded bolt and wing nut as shown in FIG. 1.

The cradle 10 supports the handle 39 of the fishing pole. The cradle is secured to the cover by the wing nut 12. The cradle provides an important balancing and tension adjustment. Loosening the wing nut 12 that holds the cradle to the top cover 13 allows the cradle to be moved to different angles so that angle of the pole vis a vis the cradle can be changed. This is because the cradle has a slot running along the midline of the cradle allowing the bolt and nut to be set at different places along the cradle. Thus, the orientation of the cradle can be changed to place the fishing pole at different angles.

Moving the cradle forward (in the direction of the end of the fishing pole) would elevate the angle of the pole so that movements of the pole will be enough to set off the alarm. With this adjustment, a large variety of pole types and weights can be set and exactly balanced to set off the alarm. Note, the movement of the cradle is a second type of adjustment in addition to that of the spring 16 and bolt 18 to be discussed.

Together, the spring tension (16 and 18) and the cradle adjustment provide a system of balancing and adjusting the sensitivity of the device. By setting the spring tension slight the alarm will signal with a slight tug on the line. With a lot of resistance on the spring, the alarm will not sound unless a heavy force is applied to the rod, e.g. when a fish is firmly hooked and running away.

The open cradle mount also allows the pole to be easily snatched out of the mount upon the sounding of the alarm as one of the cradle portions is Y-shaped which will not impede the movement of the fishing pole out of the cradle.

The cover member 30 has a top wall and four side walls and an open bottom so that it resembles an open box. The cover goes over the similarly-shaped housing 20. The housing has an open top, a bottom wall and four side walls. The cover fits over the housing so that a closed space is formed between the cover and the housing. The upper cover 30 encloses and protects the electrical parts and the other working parts inside the housing. The upper cover also acts as a pivotable surface in relation to the lower housing. The pivoting of the upper cover responds to the movements of the fishing pole attached to the upper wall.

The other components of the alarm are found inside the housing. A thumbscrew means 18 is placed through an aperture in the bottom wall of the housing and is in connection with a spring 16. This spring is attached to the underside of the top surface of the cover by the retainer 14. This makes for a tensioned connection between upper cover and lower housing which may be varied in force. Varying the tensioning force through the thumbscrew allows the switch 32 to be set off by varying degrees of downward pressure from the pole (through the upper cover).

Figure 2:
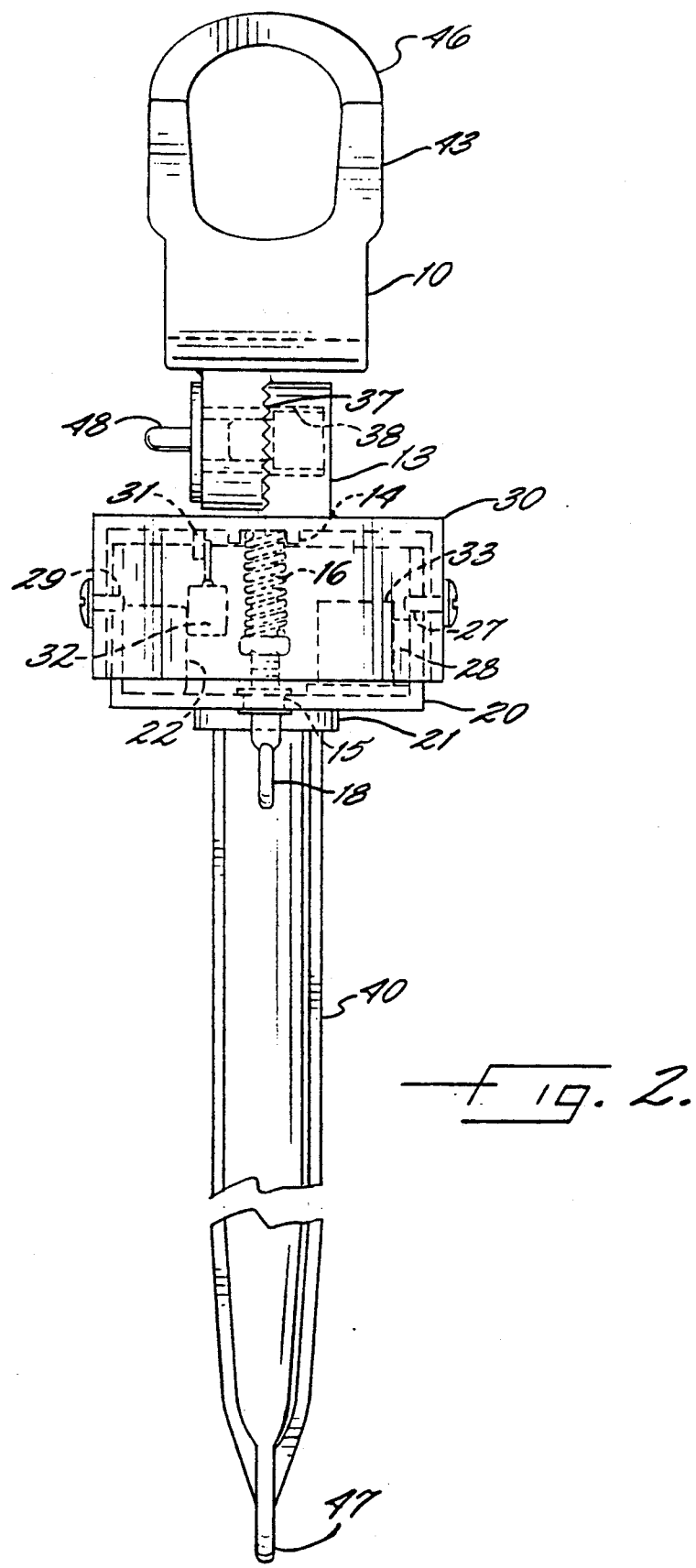

Rotation pivot 27 also describes the location of the pivot pin 29 (seen in FIG. 2). The pin may be simply a fastener for joining the upper cover 30 and housing 20. Preferably, it would be a threaded screw going through a side wall of both the cover and the housing. The pivot 27 also acts as the pivot point for the rotation of the cover in relation to the housing. In the same manner, it also provides a fixed point against which the internal spring tension assembly operates. It may also be positioned to act as a holder for the 9 volt battery to keep it in place.

The thumbscrew 18 protrudes out of the bottom wall of the housing 20 to allow one to tighten the thumbscrew which increases the force of the spring 16 on the cover 30. Thus, a greater downward pressure is needed to activate the microswitch 32 to set off the alarm. If the thumbscrew is screwed outward it will take the pressure off the spring and lessen the amount of pressure needed to for the cover to set off the alarm.

In this manner, the sensitivity of the alarm can be varied. The thumbscrew with internal spring tension assembly (thumbscrew 18, spring 16, and retainer 14) allows for simple fine adjustment of the tension/resistance factor which is also used to fine tune the amount of line pull required to rotate the upper case and cause the alarm to be activated. The position of the pole in the cradle also provides adjustment.

The switch 32 should be a micro roller arm flex spring mounted. An arm of the switch is positioned near the underside of the cover 20 and responds to downward movements of the cover. The nylon roller 31 on the end of the spring arm allows the upper case to rotate downward without binding. The flat spring arm ensures that when the upper case springs back, the switch arm rises back up to the ready position and the switch 32 is turned off.

The cover and the housing fit into one another as a pair of dissimilar sized boxes would. This ensures that the force that activates the switch 32 will only be downward force from the pole and not extraneous sideways movements of the fishing pole. Note the cover and housing preferably are not tight-fitting so that there is some room for pivoting action of the cover. These extraneous movements (sideways, etc.) are prevented for the most part by the interfitting of the cover and the housing. Forces left or right on the cover will simply force the walls of the cover against those of the housing with no effect on the switch.

The biasing thumbscrew 18 and tensioning assembly should be located closer to one end of the housing than the other. This is because the downward movement of the cradle will force one end of the cover downward, i.e. the cover pivots downward in the same direction that the cradle is tugged when there is a strike. A spring placed in the middle of the underside of the cover might not allow the cover to pivot downward.

The device comes with two types of mounts. Each is easily attached or removed from the device easily by means of a large wing nut/bolt 12-13 combination attached to the housing. A slide means can also be used. The bayonet/stake 47 allows the device to be placed on the water shore and left unattended. The clamp/screw device may also be used to attach the device to any board or similar surface at the side of a boat or dock, etc. The top part of the stake should be in connection with the underside of the bottom wall of the housing portion of the unit.

I claim:

1. A fishing alarm apparatus for holding a fishing pole and emitting signals in response to movements of a fishing pole comprising: a cover having upper wall and four side walls in connection with said upper wall as as to form a box shape, mounting means for securing the handle of said fishing pole, said mounting means in connection with the top surface of said upper wall, a housing having a bottom wall and four side walls so as to form a second box shape, said cover and said housing of dissimilar size so that they are capable of interfitting, a thumbscrew in said bottom wall of said housing and offset from the center of said bottom wall, resilient means having one end in connection with said upper wall and one end in connection with said thumbscrew, said resilient means for providing a force between said cover and said housing, pivoting means in connection with one of said side walls of said housing and said cover, said pivoting means for allowing said cover to pivot in relation to said housing and against said resilient means, switch means located in said housing and near the underside of said upper wall of said cover for causing a signal upon pivoting movement of said cover, alarm means in connection with said switch for signalling a fishing strike upon receiving said signal from said alarm.

2. The apparatus of claim 1 where said resilient means is a helical spring.

3. The apparatus of claim 2 where said mounting means has an adjusting means for adjusting the angle of said fishing pole in said mounting means.

4. The apparatus of claim 3 where said box shape of said cover is larger than said housing so that said walls of said cover fit outside the walls of said housing.

5. The apparatus of claim 4 where said pivoting means is a threaded screw.

6. The apparatus of claim 5 where said mounting means has a front and a rear end, said front end of Y shape for holding said fishing pole handle.

7. The apparatus of claim 6 wherein said rear end of said mounting means has an eyelet for holding said fishing pole handle.

8. The apparatus of claim 7 where said switch is a roller microswitch.

9. The apparatus of claim 8 where said alarm is audible.

10. The apparatus of claim 8 where said alarm is visual.

* * * * *